(12) United States Patent
Lee

(10) Patent No.: US 12,292,901 B2
(45) Date of Patent: May 6, 2025

(54) SYSTEM FOR MANAGING DATA BASED ON HIERARCHICAL DATA REPOSITORY AND OPERATING METHOD THEREOF

(71) Applicant: PARTRIDGE SYSTEMS, INC., Seoul (KR)

(72) Inventor: Jun Ha Lee, Namyangju Si (KR)

(73) Assignee: PARTRIDGE SYSTEMS, INC., Seoul (KR)

( * ) Notice: Subject to any disclaimer, the term of this patent is extended or adjusted under 35 U.S.C. 154(b) by 0 days.

(21) Appl. No.: 18/039,832

(22) PCT Filed: Nov. 22, 2021

(86) PCT No.: PCT/KR2021/017133
§ 371 (c)(1),
(2) Date: Jun. 1, 2023

(87) PCT Pub. No.: WO2022/119199
PCT Pub. Date: Jun. 9, 2022

(65) Prior Publication Data
US 2024/0028613 A1     Jan. 25, 2024

(30) Foreign Application Priority Data
Dec. 2, 2020 (KR) .................. 10-2020-0166883

(51) Int. Cl.
*G06F 16/28* (2019.01)
*G06F 16/17* (2019.01)
*G06F 16/25* (2019.01)

(52) U.S. Cl.
CPC .......... *G06F 16/282* (2019.01); *G06F 16/258* (2019.01)

(58) Field of Classification Search
None
See application file for complete search history.

(56) References Cited

U.S. PATENT DOCUMENTS

| 2013/0024424 | A1 | 1/2013 | Prahlad et al. |
| 2021/0049001 | A1* | 2/2021 | Okada ................ G06F 9/45558 |
| 2022/0394276 | A1* | 12/2022 | Muthiah ............ H04N 21/8456 |

FOREIGN PATENT DOCUMENTS

| JP | 2002-203117 A | 7/2002 |
| JP | 2006-092466 A | 4/2006 |

(Continued)

OTHER PUBLICATIONS

Tajima Yoshiyuki;JP Patent; J-PiatPat; 2000; pp. 1-14 (Year: 2000).*

(Continued)

*Primary Examiner* — Ann J Lo
*Assistant Examiner* — Jermaine A Mincey
(74) *Attorney, Agent, or Firm* — Sughrue Mion, PLLC

(57) ABSTRACT

The present invention provides a system for managing data based on a hierarchical data store and a method of operating the same. The data management system according to one embodiment of the present invention may include a data uploader for obtaining original data from one or more data sources, converting the obtained original data into corresponding lightweight data through lightweighting processing, and uploading the lightweight data to a lightweight data store and a data tracer for updating the upload location of specific original data in a mapping table in response to detecting that the specific original data is uploaded to an original data store. The data management system may efficiently reduce network costs required for data upload and infrastructure construction costs required for data sharing.

8 Claims, 14 Drawing Sheets

(56) References Cited

FOREIGN PATENT DOCUMENTS

| JP | 2018-180812 A | 11/2018 |
| KR | 10-1035302 B1 | 5/2011 |
| KR | 10-2019-0043446 A | 4/2019 |
| KR | 10-2020-0076397 A | 6/2020 |

OTHER PUBLICATIONS

Markus Nagel; "A White Paper on Neural Network Quantization";2016; Qualcomm; pp. 1-27.*
Notice of Allowance for Korean Patent Application No. 10-2020-0166883, dated Aug. 6, 2021.
Office Action for Korean Patent Application No. 10-2020-0166883, dated Apr. 16, 2021.
International Search Report for PCT/KR2021/017133 dated Feb. 21, 2022.
Communication dated Jun. 11, 2024 issued by the Japanese Patent Office in application No. 2023-534416.

\* cited by examiner

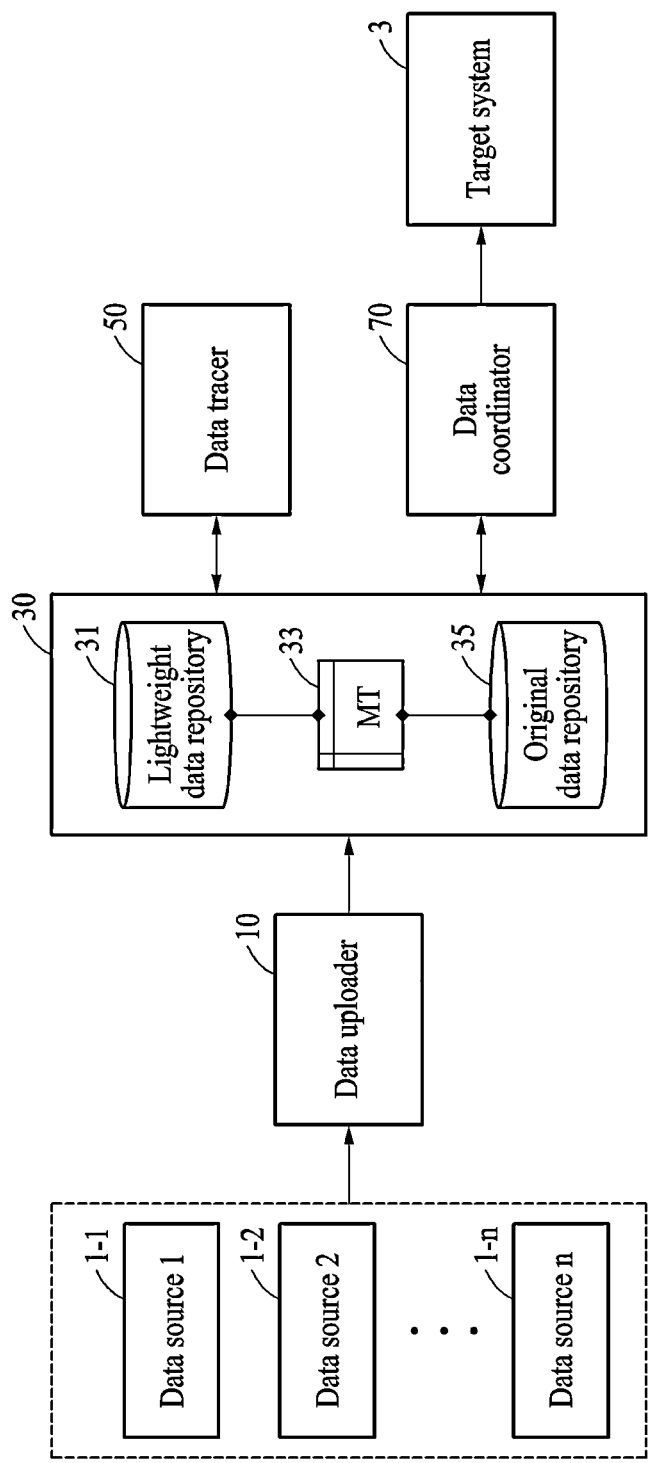
[FIG. 1]

[FIG. 2]
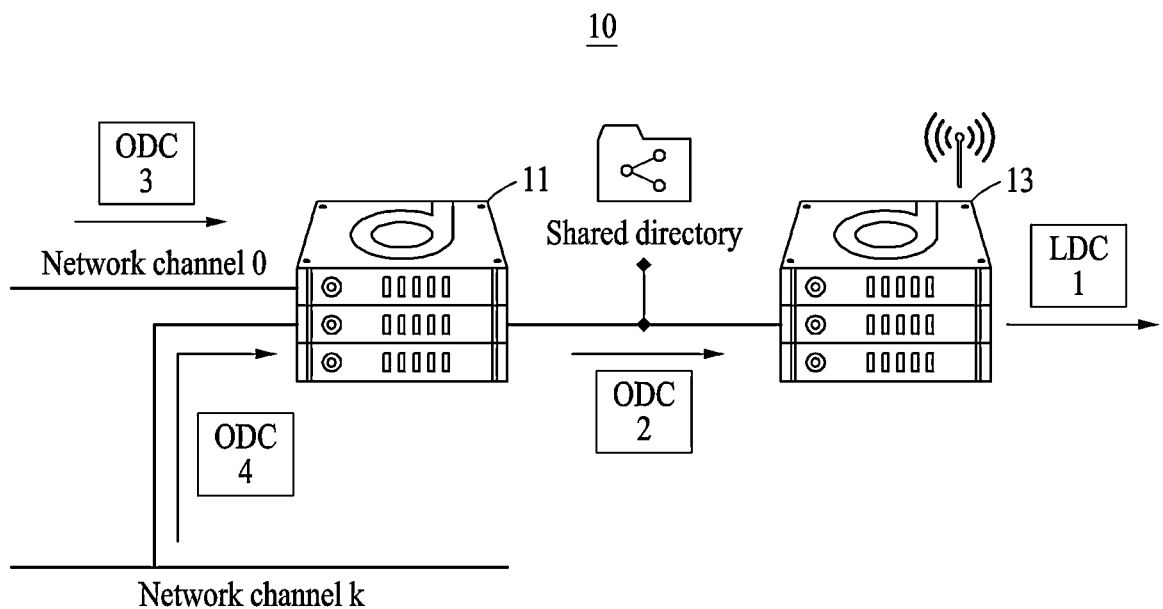

[FIG. 3]
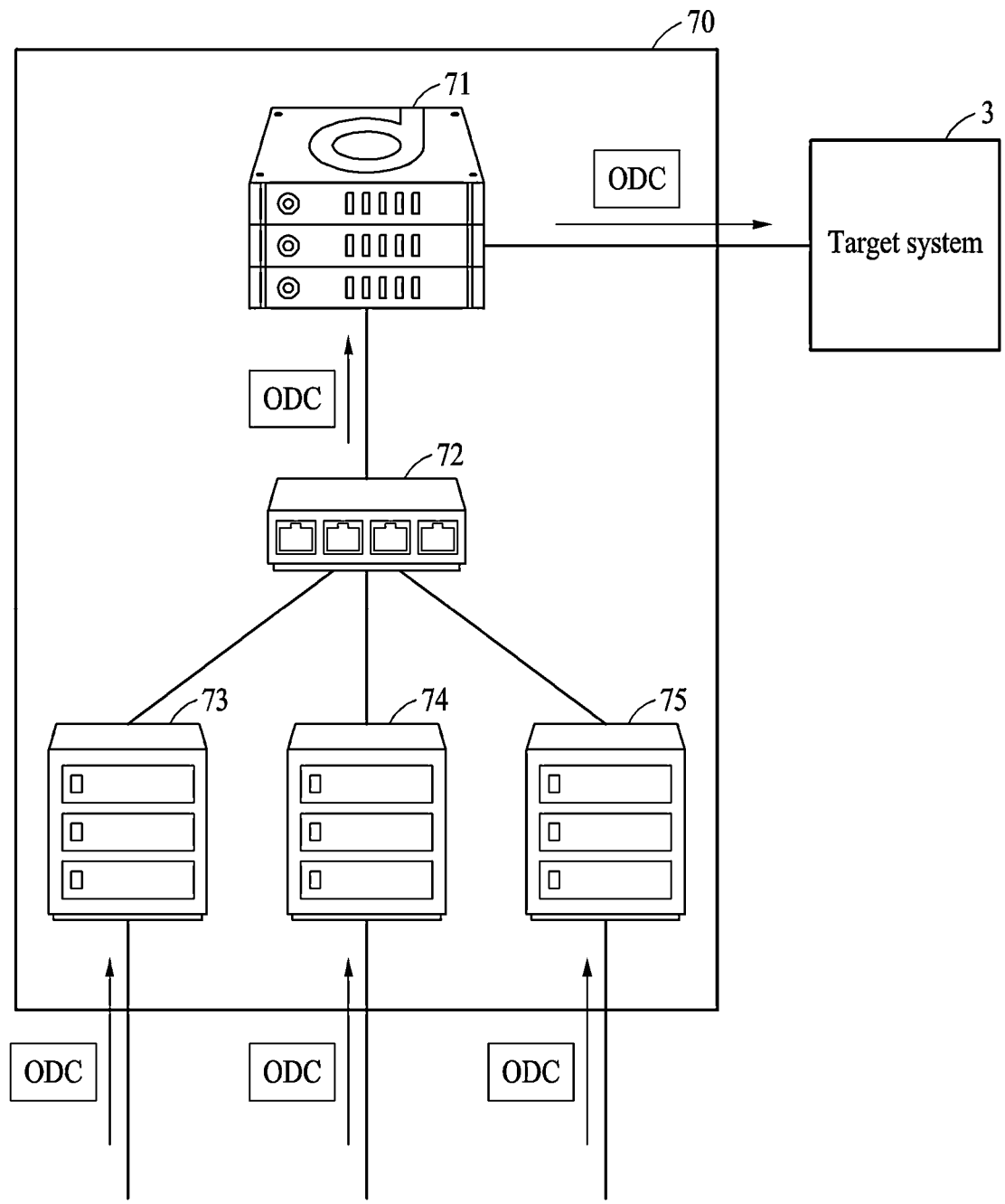

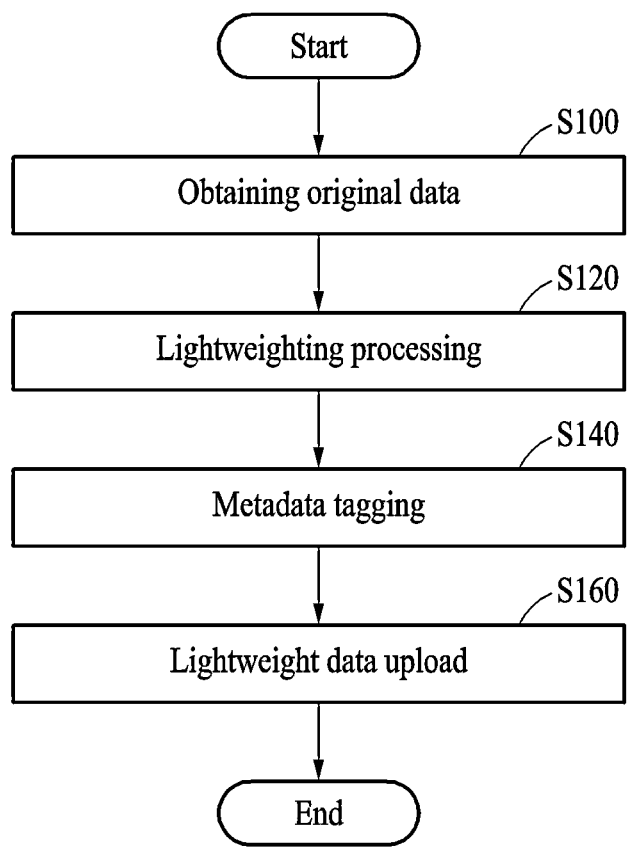
[FIG. 4]

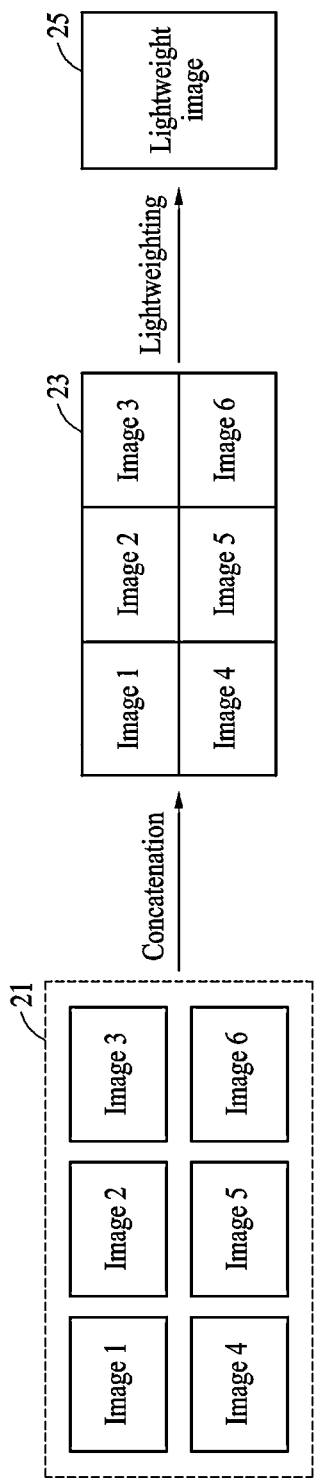

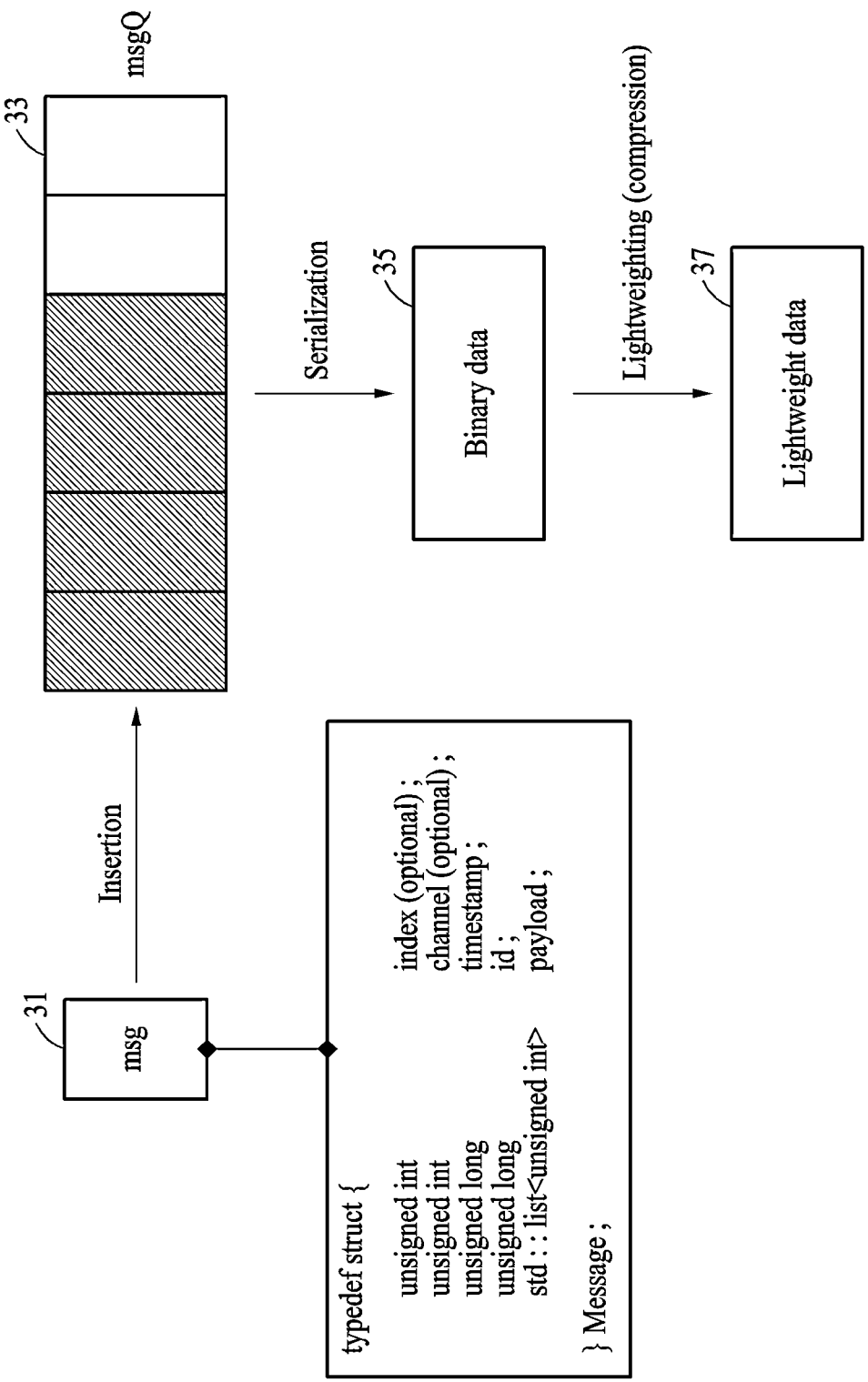

[FIG. 7]
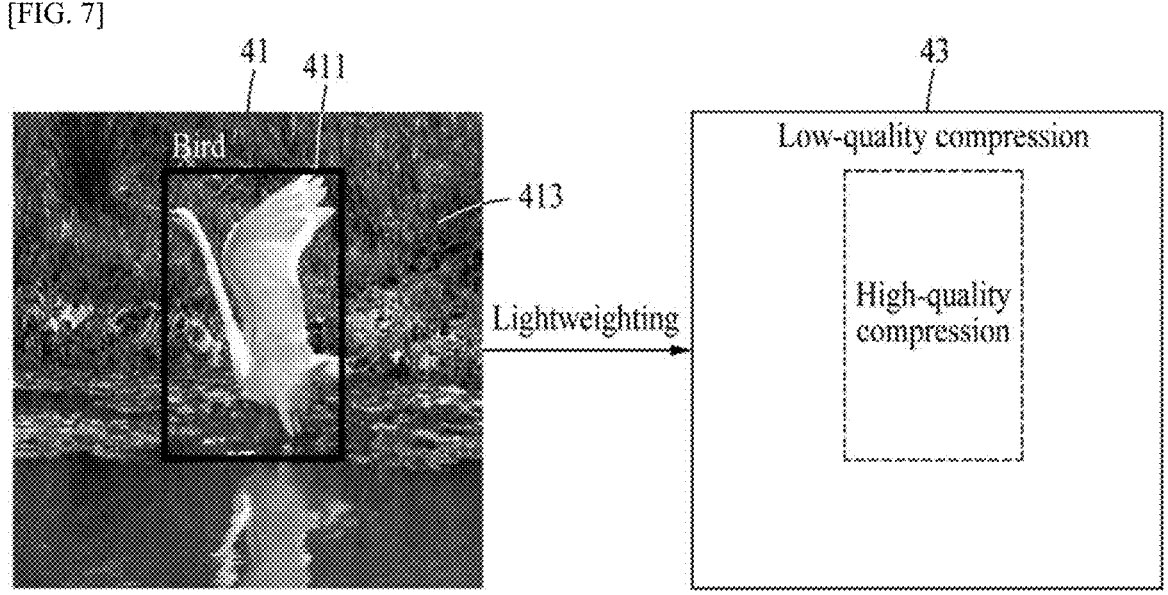

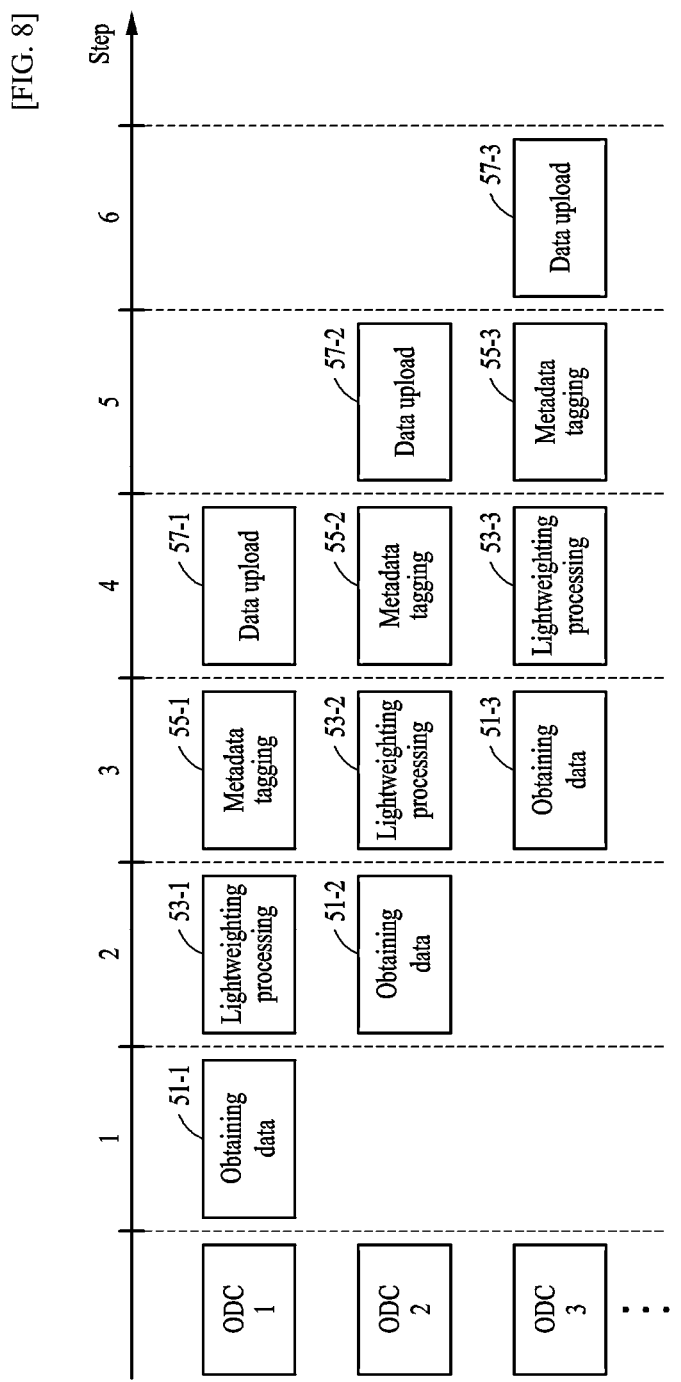

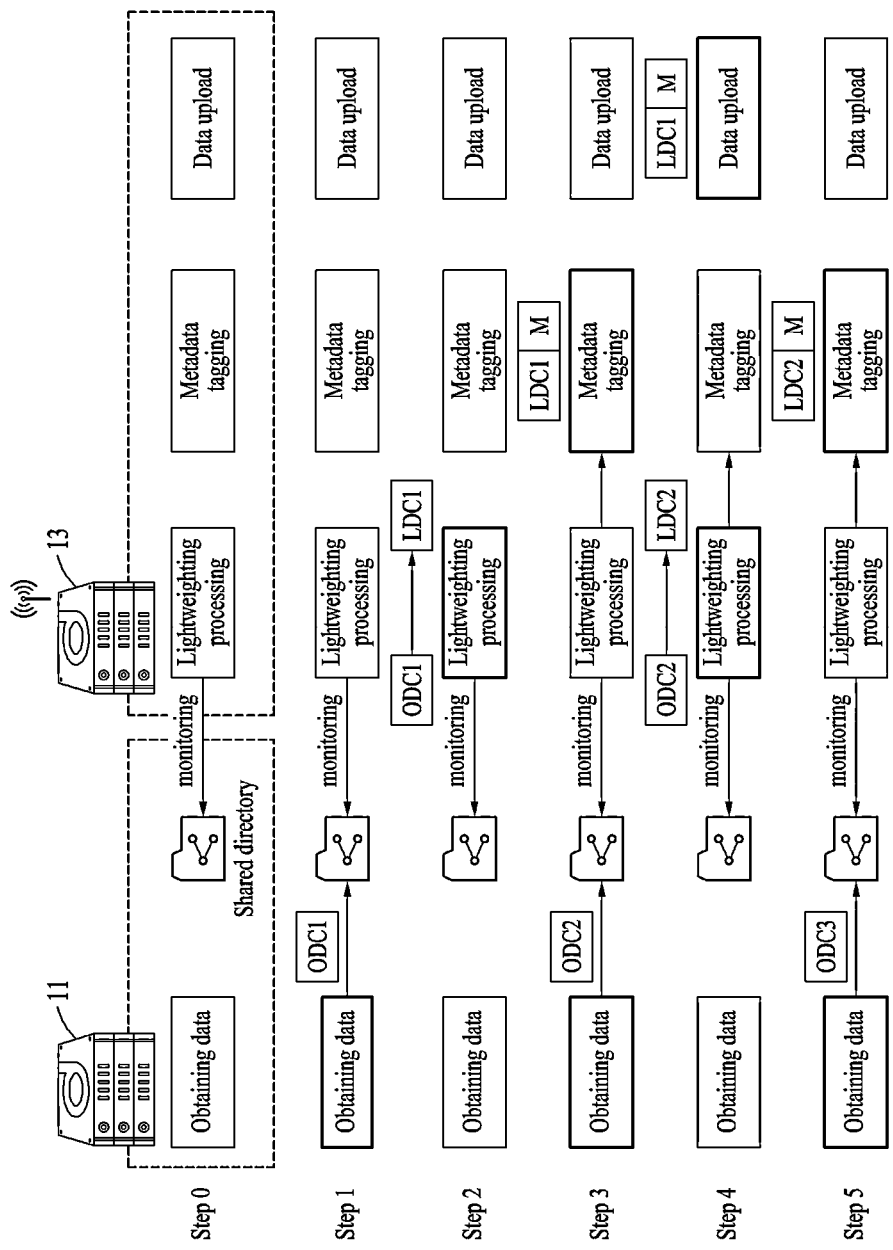

[FIG. 10]
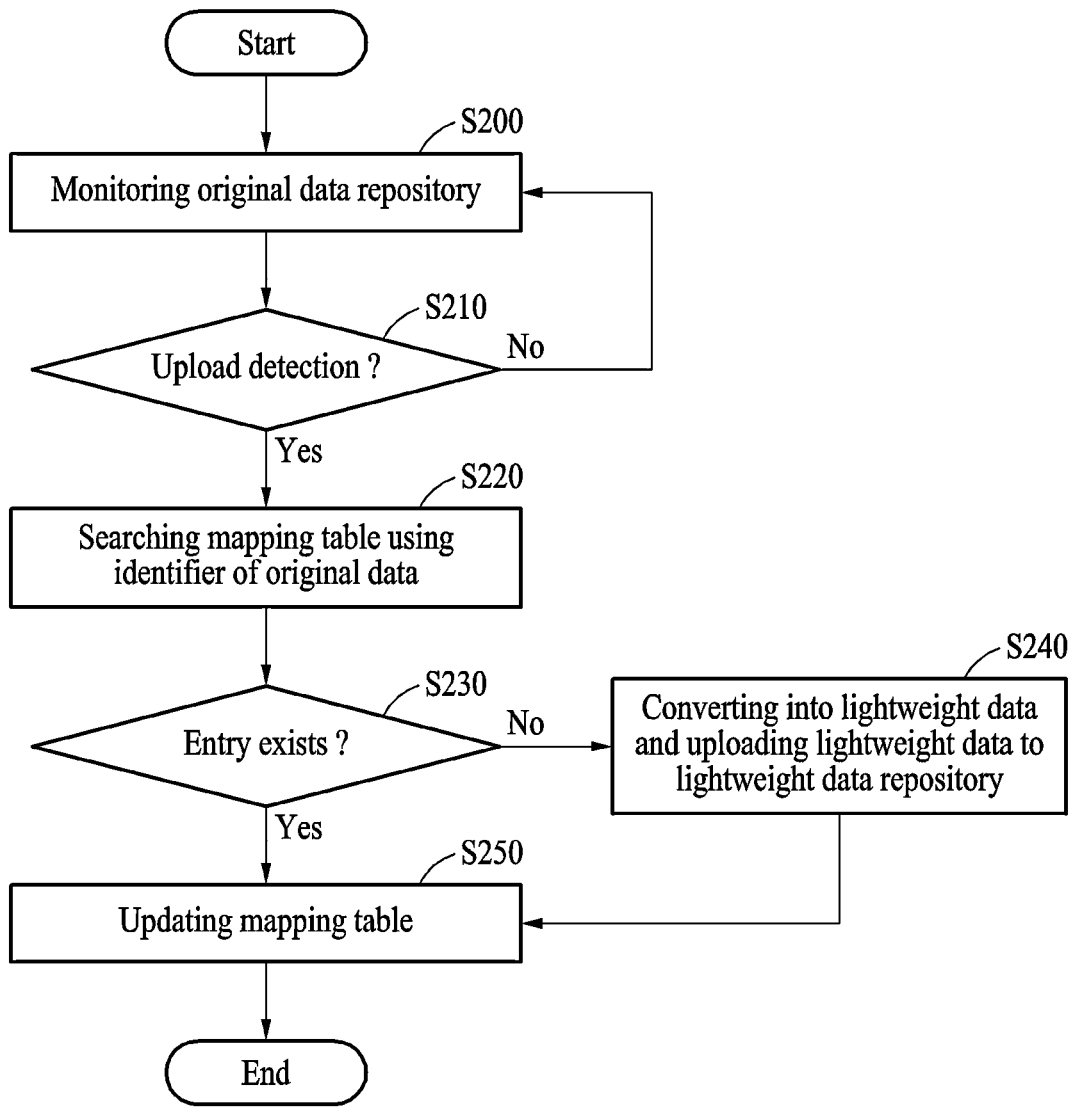

[FIG. 11]
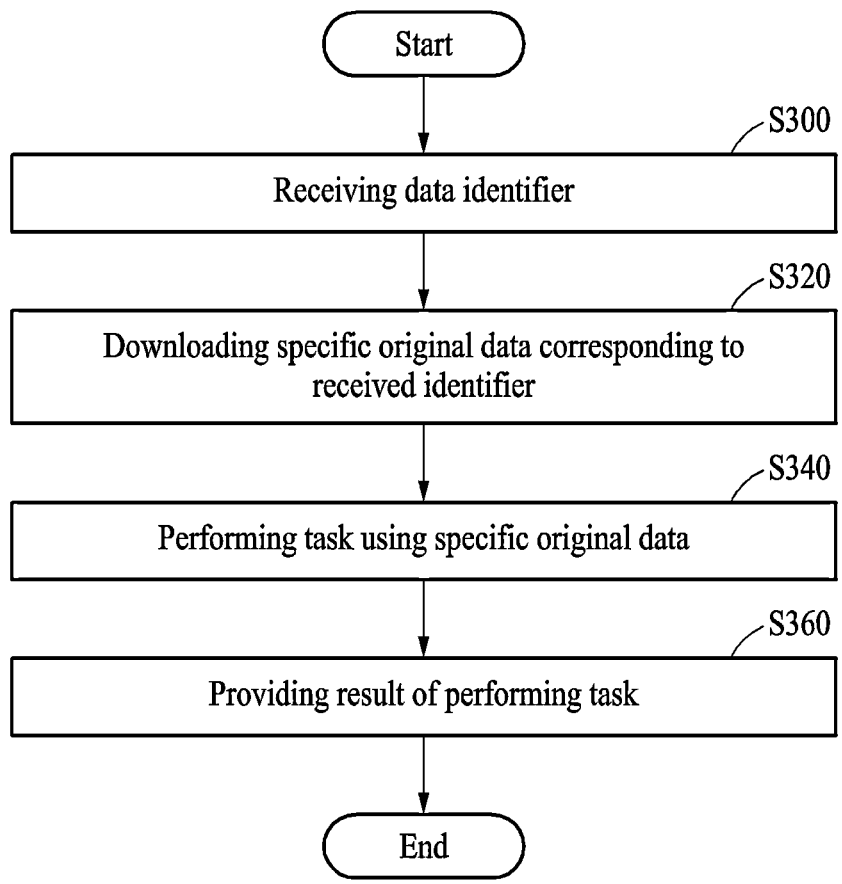

[FIG. 12]
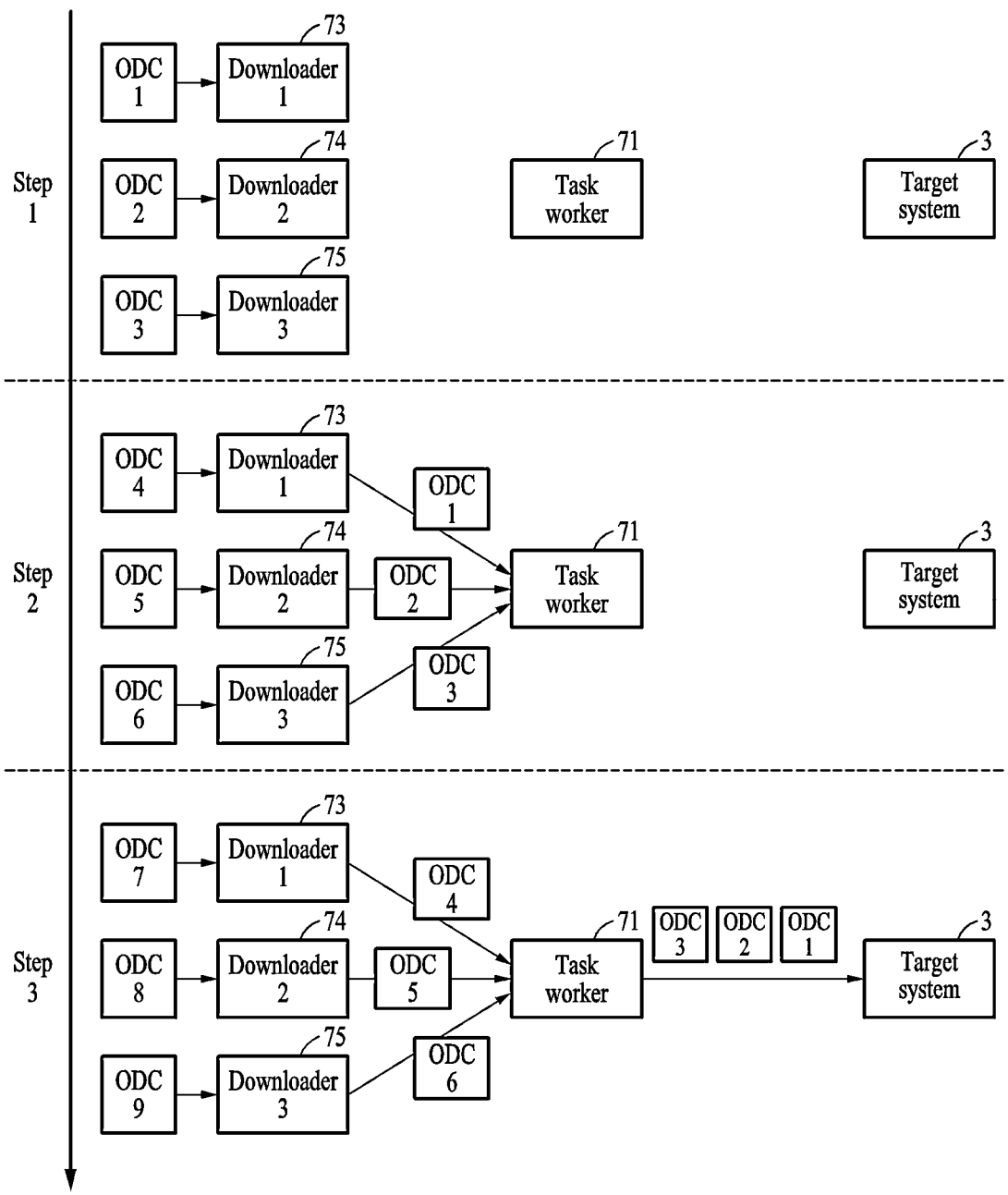

[FIG. 13]
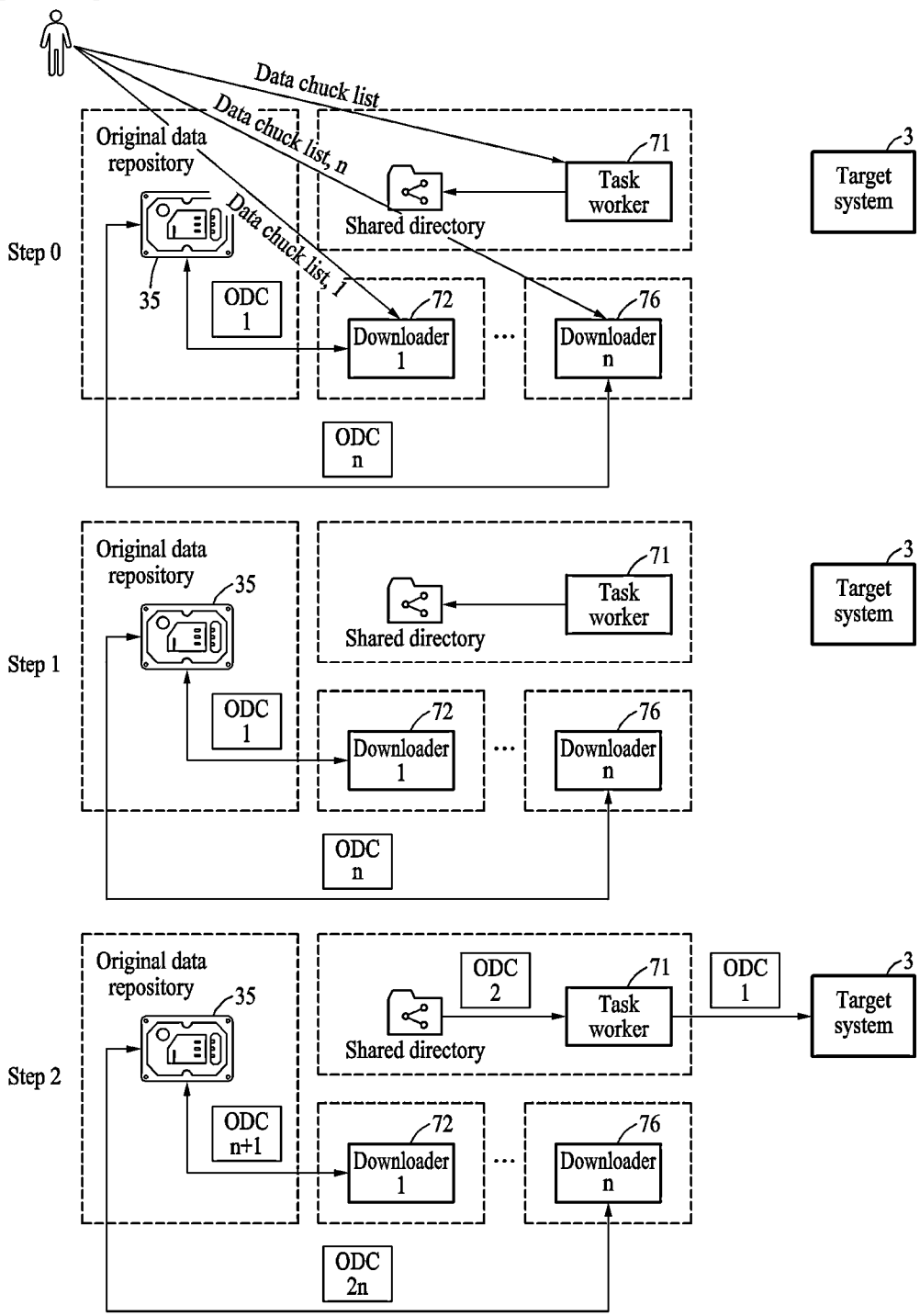

[FIG. 14]
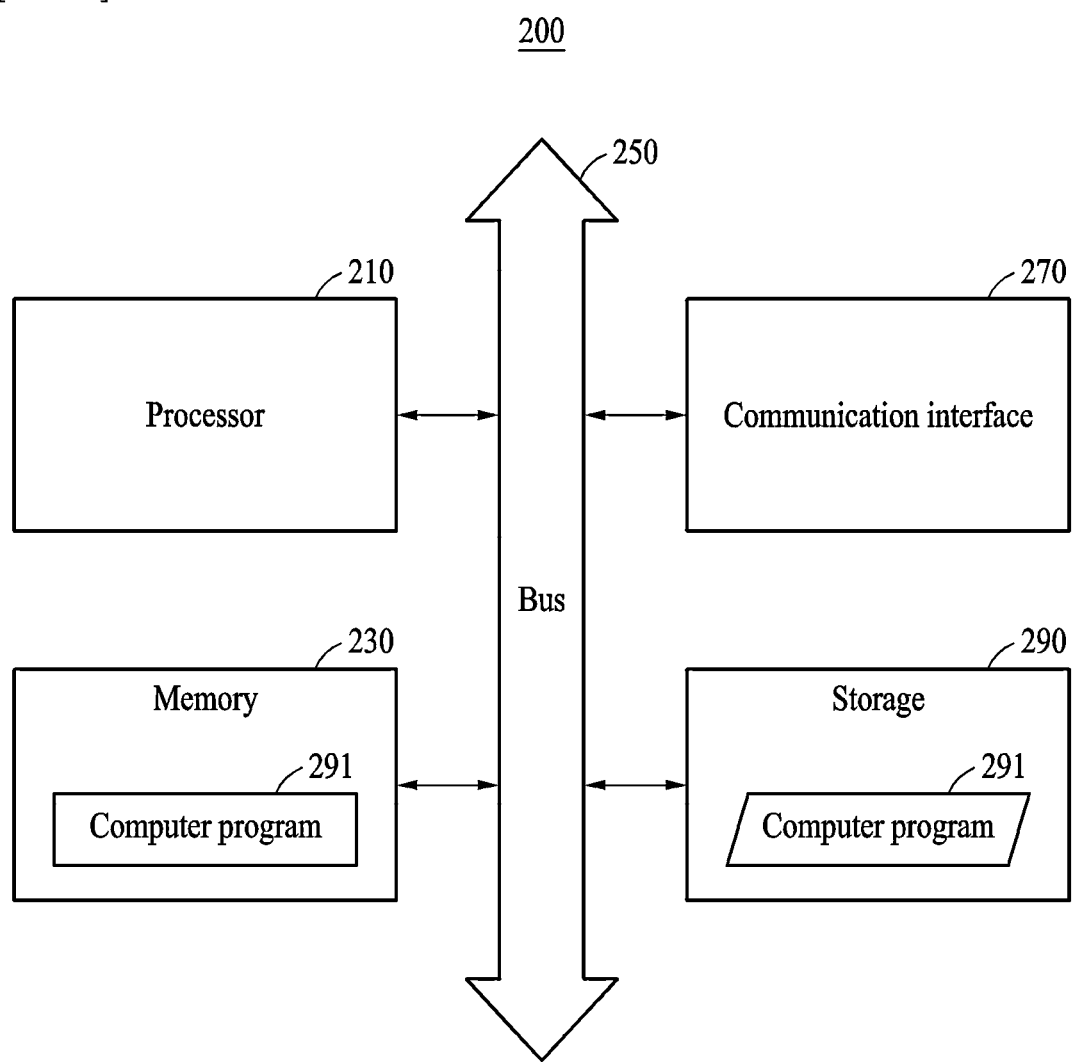

SYSTEM FOR MANAGING DATA BASED ON HIERARCHICAL DATA REPOSITORY AND OPERATING METHOD THEREOF

CROSS-REFERENCE TO RELATED APPLICATION

This application is a National Stage Entry of PCT International Application No. PCT/KR2021/017133, which was filed on Nov. 22, 2021, and claims priority to Korean Patent Application No. 10-2020-0166883, filed on Dec. 2, 2020, in the Korean Intellectual Property Office, the disclosure of which is incorporated herein by reference.

TECHNICAL FIELD

The present invention relates to a system for managing data based on a hierarchical data store and a method of operating the same, and more particularly, to a system capable of sufficiently managing mass data based on a hierarchical data store including an original data store and a lightweight data store and a method of operating the same.

BACKGROUND ART

As the Internet of Things (IoT) technology develops, the demand for a system capable of processing and managing mass data generated in real time is rapidly increasing. For example, IoT systems such as self-driving cars and smart factories generate a large amount of sensing data in real time through various sensors. A system capable of efficiently processing and managing such a large amount of sensing data is required.

In response to this demand, a system for uploading mass data to a cloud storage and managing the data has recently been proposed. The proposed system can guarantee excellent user accessibility by providing data upload and download functions without time and place limitations.

However, to upload mass data to a cloud storage, considerable infrastructure construction and network costs are required. In addition, it is impossible to upload continuously generated mass data to a cloud storage in real time due to the problem of available bandwidth of a network.

DISCLOSURE

Technical Problem

Therefore, the present invention has been made in view of the above problems, and it is one object of the present invention to provide a data management system capable of reducing infrastructure construction costs required for data sharing and network costs required for data upload and a method of operating the data management system.

It is another object of the present invention to provide a system capable of efficiently managing mass data based on a hierarchical data store including an original data store and a lightweight data store and a method of operating the system.

It is still another object of the present invention to provide a device capable of guaranteeing real-time upload of mass data and a method of operating the device.

It is still another object of the present invention to provide a device capable of performing optimal lightweighting processing depending on the type of data and a method of operating the device.

It is still another object of the present invention to provide a device capable of providing synchronization and tracing functions between original data and lightweight data and a method of operating the device.

It is yet another object of the present invention to provide a device capable of reducing network costs required for downloading original data and a method of operating the device.

The technical problems that are intended to be achieved in the present invention are not restricted to the above described problems, and other problems, which are not mentioned herein, could be clearly understood by those of ordinary skill in the art from details described below.

Technical Solution

In accordance with one aspect of the present invention, provided is a data management system including a data uploader for obtaining original data from one or more data sources, converting the obtained original data into corresponding lightweight data through lightweighting processing, uploading the converted lightweight data to a lightweight data store, and registering upload information about the converted lightweight data in a mapping table; and a data tracer for, in response to detecting upload of specific original data to an original data store, searching entry of lightweight data corresponding to the specific original data in the mapping table and updating an upload location of the specific original data to the searched entry.

In one embodiment, the lightweight data store may be implemented as a store with higher user accessibility than the original data store.

In one embodiment, the data uploader may perform operation of obtaining the original data, operation of converting the original data into the lightweight data, and operation of uploading the lightweight data to the lightweight data store in a pipelining manner.

In one embodiment, the data management system may further include a data coordinator for downloading the specific original data from the original data store and performing a predefined task using the specific original data.

In one embodiment, the data coordinator may be configured to include a downloader for downloading the specific original data and a task worker for performing the task, wherein operation of the downloader and operation of the task worker may be performed in a pipelining manner.

In accordance with another aspect of the present invention, provided is a data uploader including a communication interface; a memory for storing one or more instructions; and a processor for obtaining original data by executing the stored instructions, performing first lightweighting processing in response to determining that the obtained original data is of a first type, performing second lightweighting processing different from the first lightweighting processing in response to determining that the obtained original data is of a secondo type different from the first type, and uploading lightweight data converted through the first lightweighting processing or the second lightweighting processing through the communication interface.

In accordance with still another aspect of the present invention, provided is a method of uploading original data performed in a computing device, the method including a step of obtaining original data, a step of performing first lightweighting processing in response to determining that the obtained original data is of a first type, a step of performing second lightweighting processing different from the first lightweighting processing in response to determining that the obtained original data is of a second type different from the first type, and a step of uploading lightweight data converted through the first lightweighting processing or the second lightweighting processing.

A computer program according to one embodiment of the present invention may be stored in a computer-readable recording medium to execute a step of obtaining original data, a step of performing first lightweighting processing in response to determining that the obtained original data is of a first type, a step of performing second lightweighting processing different from the first lightweighting processing in response to determining that the obtained original data is of a second type different from the first type, and a step of uploading lightweight data converted through the first lightweighting processing or the second lightweighting processing.

In accordance with still another aspect of the present invention, provided is a data coordinator for a hierarchical data store including a lightweight data store and an original data store, the data coordinator including a communication interface; a memory for storing one or more instructions; and a processor for receiving an identifier of specific lightweight data stored in the lightweight data store through the communication interface by executing the stored instructions, downloading original data corresponding to the specific lightweight data from the original data store using the received identifier, and performing a predefined task using the downloaded original data.

In accordance with yet another aspect of the present invention, provided is a method of coordinating data performed in a computing device for a hierarchical data store including a lightweight data store and an original data store, the method including a step of receiving an identifier of specific lightweight data stored in the lightweight data store, a step of downloading original data corresponding to the specific lightweight data from the original data store using the received identifier, and a step of performing a predefined task using the downloaded original data.

A computer program according to one embodiment of the present invention may be stored in a computer-readable recording medium to execute a step of receiving an identifier of specific lightweight data stored in a lightweight data store, a step of downloading original data corresponding to the specific lightweight data from an original data store using the received identifier, and a step of performing a predefined task using the downloaded specific original data.

Advantageous Effects

According to one embodiment of the present invention, original data can be converted into lightweight data through lightweighting processing, and the converted lightweight data can be uploaded. Accordingly, real-time data upload can be guaranteed, and network costs required for data upload can be significantly reduced.

In addition, by implementing only a lightweight data store as a store with high user accessibility (e.g., cloud storage), infrastructure construction costs for data sharing can be greatly reduced.

In addition, the efficiency of lightweighting processing can be improved by applying different types of lightweighting algorithms according to the type and characteristics of original data rather than a simple compression method.

In addition, by performing lightweighting processing, data upload operation, and the like in a pipelining manner, real-time data upload can be more reliably guaranteed.

In addition, by providing a data tracer that detects upload of original data and tracks an upload position, the correspondence between original data and lightweight data can be effectively managed, and data synchronization between original data and lightweight data can be guaranteed.

In addition, by providing a data coordinator that downloads original data and performs a predefined task, the user's direct download of original data can be minimized. Accordingly, network costs required for original data download can be greatly reduced, and infrastructure construction costs for an original data store can also be greatly reduced.

In addition, task execution time can be significantly reduced by performing original data download and task execution operations in a pipelining manner.

Effects according to the technical idea of the present invention are not limited to the effects mentioned above, and other effects not mentioned will be clearly understood by those skilled in the art from the description below.

DESCRIPTION OF DRAWINGS

FIG. 1 is an exemplary configuration diagram schematically showing a system for managing data based on a hierarchical data store according to one embodiment of the present invention.

FIG. 2 is an exemplary diagram for explaining a method of implementing a data uploader according to one embodiment of the present invention.

FIG. 3 is an exemplary diagram for explaining a method of implementing a data coordinator according to one embodiment of the present invention.

FIG. 4 is an exemplary flowchart for explaining an operation method of a data uploader according to one embodiment of the present invention.

FIGS. 5 to 7 are exemplary diagrams for explaining a lightweighting processing method of a data uploader according to one embodiment of the present invention.

FIGS. 8 and 9 are exemplary diagrams for explaining a pipelining manner capable of being applied to a data uploader according to one embodiment of the present invention.

FIG. 10 is an exemplary flowchart for explaining an operation method of a data tracer according to one embodiment of the present invention.

FIG. 11 is an exemplary flowchart for explaining an operation method of a data coordinator according to one embodiment of the present invention.

FIGS. 12 and 13 are exemplary diagrams for explaining a pipelining manner capable of being applied to a data coordinator according to one embodiment of the present invention.

FIG. 14 shows an exemplary computing device capable of implementing a device and/or system according to various embodiments of the present invention.

BEST MODE

Specific structural and functional descriptions of embodiments according to the concept of the present invention disclosed herein are merely illustrative for the purpose of explaining the embodiments according to the concept of the present invention. Furthermore, the embodiments according to the concept of the present invention can be implemented in various forms and the present invention is not limited to the embodiments described herein.

The embodiments according to the concept of the present invention may be implemented in various forms as various modifications may be made. The embodiments will be described in detail herein with reference to the drawings. However, it should be understood that the present invention is not limited to the embodiments according to the concept of the present invention, but includes changes, equivalents, or alternatives falling within the spirit and scope of the present invention.

The terms such as "first" and "second" are used herein merely to describe a variety of constituent elements, but the constituent elements are not limited by the terms. The terms are used only for the purpose of distinguishing one constituent element from another constituent element. For example, a first element may be termed a second element and a second element may be termed a first element without departing from the teachings of the present invention.

It should be understood that when an element is referred to as being "connected to" or "coupled to" another element, the element may be directly connected or coupled to the other element or intervening elements may be present. In contrast, when an element is referred to as being "directly connected to" or "directly coupled to" another element, there are no intervening elements present. Other words used to describe the relationship between elements or layers should be interpreted in a like fashion (e.g., "between," versus "directly between," "adjacent," versus "directly adjacent," etc.).

The terms used in the present specification are used to explain a specific exemplary embodiment and not to limit the present inventive concept. Thus, the expression of singularity in the present specification includes the expression of plurality unless clearly specified otherwise in context. Also, terms such as "include" or "comprise" should be construed as denoting that a certain characteristic, number, step, operation, constituent element, component or a combination thereof exists and not as excluding the existence of or a possibility of an addition of one or more other characteristics, numbers, steps, operations, constituent elements, components or combinations thereof.

Unless otherwise defined, all terms (including technical and scientific terms) used herein have the same meaning as commonly understood by one of ordinary skill in the art to which the present invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present invention will be described in detail with reference to the accompanying drawings. However, the scope of the present invention is not limited by these embodiments. Like reference numerals in the drawings denote like elements.

FIG. 1 is an exemplary configuration diagram schematically showing a system for managing data based on a hierarchical data store according to one embodiment of the present invention.

As shown in FIG. 1, the data management system be a system that manages original data obtained from one or more data sources 1-1 to 1-*n* using a hierarchical data store 30.

Here, the data sources 1-1 to 1-*n* are modules that generate or provide original data. For example, the data sources 1-1 to 1-*n* may be sensors that generate sensing data in real time, data models that generate predetermined data, and devices/systems equipped with the sensors or the data models. As a more specific example, the data sources 1-1 to 1-*n* may be Internet of Things (IoT) systems (or sensor-based systems) such as autonomous cars, smart homes, smart farms, and smart factors or various sensors constituting the systems. In this case, the data management system may function as a system that efficiently manages a large amount of sensing data generated in real time from various sensors by using the hierarchical data store 30. For example, the data management system may manage a large amount of sensing data generated in real time from various sensors of an autonomous car using the hierarchical data store 30 and analyze sensing data through a target system 3 to ensure normal operation of the autonomous car. At this time, the target system 3 may be an artificial intelligence model learned to determine whether operation of the autonomous car is normal from sensing data or a computing device/system equipped with the model. Hereinafter, the reference number "1" is used to collectively refer to the data sources 1-1 to 1-*n* or to refer to the data source 1-1, 1-2, or 1-*n*.

As shown in, the data management system may include a data uploader 10, the hierarchical data store 30, a data tracer 50, and a data coordinator 70. However, this configuration is only a preferred embodiment for achieving the purpose of the present invention, and some components may be added or deleted as needed. In addition, components (e.g., 10, 50, 70, etc.) of the data management system shown in FIG. 1 represent functionally distinct functional elements, and a plurality of components may be implemented in a form integrated with each other in an actual physical environment.

In addition, the components (e.g., 10, 50, 70, etc.) in an actual physical environment may be separated into a plurality of detailed functional elements or implemented in a plurality of physical computing devices. For example, a first function of the data uploader 10 may be implemented in a first computing device, and a second function of the data uploader 10 may be implemented in a second computing device. Alternatively, specific functions of the data uploader 10 may be implemented in a plurality of computing devices.

For example, the computing device may include a notebook, a desktop, a laptop, and the like, but the present invention is not limited thereto. The computing device may include all types of devices equipped with a computing function. An example of the computing device is presented in FIG. 14. Hereinafter, each component of the data management system will be described.

The data uploader 10 may be a computing module or computing device having a upload function for original data obtained from a data source 1. More specifically, the data uploader 10 may convert original data obtained from the data source 1 into lightweight data through lightweighting processing and upload the converted lightweight data to a lightweight data store 31. By this operation, network costs required for data upload may be greatly reduced, and data upload may be performed in real time even in an environment where a large amount of original data is generated. Hereinafter, for convenience of explanation, the data uploader 10 will be abbreviated as "uploader 10".

FIG. 1 shows the case where the data source 1 and the uploader 10 have a many-to-one relationship. However, the data source 1 and the uploader 10 may have a one-to-one relationship or a many-to-many relationship. In addition, the uploader 10 may be implemented as a separate computing device distinct from the data source 1, or may be implemented as a computing module mounted in the data source 1 or a system related to the data source 1.

The uploader 10 may be implemented as one or more computing devices (or modules). However, the specific implementation method may vary depending on embodiments.

In one embodiment, the uploader 10 may be implemented as a single computing device. For example, in an environment where a load (e.g., computing costs) required for the uploader 10 is not high (e.g., when the amount of original data generated is small or computing costs required for lightweighting processing are low), operations such as original data acquisition, lightweighting processing, and data upload may be performed simultaneously within a single computing device.

In another embodiment, the uploader 10 may be implemented as a plurality of computing devices. For example, as shown in FIG. 2, the uploader 10 may be implemented as a first computing device 11 for obtaining original data (or original data chunk (e.g., ODC3, ODC4, etc.)) and a second computing device 13 for performing lightweighting processing and upload of lightweight data (or lightweight data chunk (e.g., LDC1)). In this case, the first computing device 11 and the second computing device 13 may be connected through a communication cable (e.g., crossover cable, direct cable, etc.). For example, the second computing device 13 may obtain original data from the first computing device 11 through a shared directory. For example, the present invention is not limited thereto. As another example, the uploader 10 may be implemented as the first computing device (e.g., 11) for obtaining original data, the second computing device for performing lightweighting processing, and a third computing device for performing data upload.

In another embodiment, the uploader 10 may be implemented as a plurality of computing devices and may operate in different ways according to measured loads. Specifically, when a measured load is less than a reference value, all operations of the uploader 10 may be performed by a single computing device. When a measured load is greater than the reference value, the operations of the uploader 10 may be performed by a plurality of computing devices. For example, when a measured load is greater than the reference value, the uploader 10 may operate as illustrated in FIG. 2.

The operation method of the uploader 10 will be described in detail with reference to FIG. 4 and subsequent drawings. In the present invention, the operation method of the uploader 10 may be named "data upload method".

Referring again to FIG. 1, the present invention will be described.

The hierarchical data store 30 may be a storage in which lightweight data and original data are stored. As shown in FIG. 1, the hierarchical data store 30 may include the lightweight data store 31, an original data store 35, and a mapping table 33.

The lightweight data store 31 is a store in which lightweight data is stored (uploaded), and may conceptually be a store of an upper layer. For example, lightweight data uploaded by the data uploader 10 may be stored in the lightweight data store 31. The lightweight data store 31 may be used for purposes such as reviewing or sharing data among multiple users, but the scope of the present invention is not limited thereto.

Next, the original data store 35 is a store in which original data is stored (uploaded), and may conceptually be a store of a lower layer. For example, original data uploaded later by a user may be stored in the original data store 35.

The stores 31 and 35 may be implemented in various forms such as files, databases, cloud storages, local storages, and blockchain networks. Accordingly, the scope of the present invention is not limited by the form of implementation of the stores 31 and 35.

In one embodiment, the lightweight data store 31 may be implemented as a storage with relatively high user accessibility, and the original data store 35 may be implemented as a storage with relatively low user accessibility. For example, the lightweight data store 31 may be implemented as a cloud storage that is easily accessible by multiple users, and the original data store 35 may be implemented as a local storage (e.g., local data center). In this case, infrastructure construction costs required for data sharing may be significantly reduced.

In addition, FIG. 1 illustrates the hierarchical data store 30 consisting of two layers of the data stores 31 and 35, but the scope of the present invention is not limited thereto, and the hierarchical data store 30 may consist of three or more layers. For example, the hierarchical data store 30 may consist of the original data store (e.g., 35), a first lightweight data store (e.g., 31) for storing first lightweight data, and a second lightweight data store for storing second lightweight data generated by performing additional lightweighting processing (e.g., data summarization) on the first lightweight data.

Next, the mapping table 33 is a table that stores correspondence between lightweight data and original data, and upload information of lightweight data and original data may be stored in each entry of the mapping table 33.

For example, the upload information of lightweight data may include an identifier (e.g., ID, name, etc.) of lightweight data, an upload location of lightweight data, etc., but the present invention is not limited thereto. In addition, for example, the upload information of original data may include an identifier of original data, an upload location of original data, etc., but the present invention is not limited thereto. Original data corresponding to lightweight data may share the same identifier, and a separate identifier may be assigned to each data depending on implementation methods.

The mapping table 33 may be designed and implemented in a variety of ways. For example, the mapping table 33 may have an identifier (e.g., ID, name, etc.) shared between original data and lightweight data as a key, and may be implemented as a hash table having an upload location of lightweight data or original data as a value. However, the scope of the present invention is not limited thereto.

Next, the data tracer 50 may be a computing module or computing device having a tracing function for original data and/or lightweight data. Specifically, the data tracer 50 may monitor the original data store 35 to detect uploading of specific original data. In response to the upload, the data tracer 50 may update the mapping table 33 by recording an upload location of the specific original data in a related entry of the mapping table 33. As another example, the data tracer 50 may detect that specific lightweight data is uploaded to the lightweight data store 31. In response to the upload, the data tracer 50 may record an upload location of the specific lightweight data in a related entry of the mapping table 33. Hereinafter, for convenience of description, the data tracer 50 will be abbreviated as "tracer 50".

In one embodiment, the tracer 50 may perform data synchronization between the lightweight data store 31 and the original data store 35. For example, the tracer 50 may detect deletion of specific original data from the original data store 35 and may delete corresponding lightweight data from the lightweight data store 31 in response to the detection. Alternatively, the tracer 50 may detect deletion of specific lightweight data from the lightweight data store 31 and may delete corresponding original data from the original data store 35 in response to the detection. As another example, the tracer 50 may inspect correspondence between the lightweight data store 31 and the original data store 35 and perform data synchronization based on the inspection result. For example, in response to a check result that corresponding lightweight data does not exist in specific original data, the tracer 50 may generate lightweight data for the specific original data and upload the lightweight data to the lightweight data store 31. In this embodiment, data synchronization may be performed periodically or aperiodically. For example, the tracer 50 may perform data synchronization when available computing resources are greater than or equal to a reference value.

An operation method of the tracer 50 will be described in detail with reference to FIG. 10 later. In the present invention, the operation method of the tracer 50 may be named "data tracing method".

Next, the data coordinator 70 may be a computing module or computing device capable of performing a predefined task using data stored in the hierarchical data store 30. For example, the data coordinator 70 may download specific original data from the original data store 35 according to a user's request (command) and transmit the specific original data to the target system 3 to perform a predetermined task. In this case, since the user's access to the original data store 35 and download of the original data is minimized, the network costs of downloading the original data may be significantly reduced. Preferably, the data coordinator 70 may be physically located close to the original data store 35, and may be connected to the original data store 35 through a line (e.g., high-bandwidth dedicated line) that guarantees high-speed data download. The data coordinator 70 and the target system 3 may communicate with each other using an appropriate communication cable and/or communication method (e.g., Ethernet, LVDS, etc.). Hereinafter, for convenience of description, the data coordinator 70 will be abbreviated as "coordinator 70".

For example, the task may include arbitrary processing tasks using original data and/or lightweight data, such as learning of the target system 3 (e.g., AI-based anomaly detection model learning) and verification of a data source 1-related system through the target system 3 (e.g., judging anomalies in a data source 1-related system through an anomaly detection model). Accordingly, the scope of the present invention is not limited to a specific type of task.

In addition, the coordinator 70 may be implemented as one or more computing devices (or modules). However, a specific implementation method may vary depending on the embodiments.

In one embodiment, as shown in FIG. 3, the coordinator 70 may be implemented as a task worker 71 and a plurality of downloaders 73 to 75. The task worker 71 is a computing device that performs a predefined task, and may be connected through a communication device such as the downloaders 73 to 75 and a switch 72. The downloaders 73 to 75 may download original data (or original data chunk (ODC)) from the original data store 35, and the task worker 71 may transmit (inject) the downloaded original data (ODC) to the target system 3 to perform a predefined task. For example, the task worker 71 may obtain original data (ODC) from the downloaders 73 to 75 through a shared directory, but the scope of the present invention is not limited thereto. For reference, FIG. 3 assumes an environment in which a data transfer rate to the target system 3 exceeds a data download rate, and in other environments, the number of the task worker 71 and the downloaders 73 to 75 will be designed differently from that shown in FIG. 3.

The operation method of the coordinator 70 will be described in detail later with reference to FIGS. 11 to 13. In the present invention, the operation method of the coordinator 70 may be named "data coordinating method".

In addition, at least some of the components (e.g., 10) shown in FIG. 1 may mean a software or a hardware such as Field Programmable Gate Array (FPGA) or Application-Specific Integrated Circuit (ASIC). However, the components are not limited to the software or hardware, and may be configured to reside in an addressable storage medium and may be configured to execute one or more processors. Functions provided within the components may be implemented by more subdivided components, or may be implemented as a single component that performs a specific function by combining a plurality of components.

So far, with reference to FIGS. 1 to 3, a hierarchical data store-based data management system according to one embodiment of the present invention has been described. Hereinafter, various operation methods that may be performed in the data management system will be described in detail with reference to FIG. 4 and subsequent drawings.

Each step of the methods to be described below may be implemented with one or more instructions executed by a processor of a computing device. For convenience of understanding, the description will be continued by assuming the system configuration illustrated in FIG. 1. Accordingly, it may be understood that when the operator of a specific step is omitted, the step may be performed by the components (e.g., 10, 50, 70, etc.) of the data management system exemplified in FIG. 1.

FIG. 4 is an exemplary flowchart for explaining the operation method of the data uploader 10 according to one embodiment of the present invention. However, the method is only a preferred embodiment for achieving the purpose of the present invention, and some steps may be added or deleted as needed.

As shown in FIG. 4, the operation method may start at step S100 of obtaining original data. For example, the uploader 10 may obtain original data from one or more data sources 1. For example, such original data may be mass data generated in real time. However, the present invention is not limited thereto.

In step S120, lightweighting processing is performed on the obtained original data, so that the original data may be converted into lightweight data. For example, the uploader 10 may perform first lightweighting processing in response to determining that the obtained original data is of a first type, and may perform second lightweighting processing different from the first lightweighting processing in response to determining that the obtained original data is of a second type different from the first type. That is, for efficiency of lightweighting processing, different lightweighting algorithms may be applied according to the type of original data. Hereinafter, the lightweighting processing method will be described in detail.

In one embodiment, original data may be a single image. For example, original data may be a single view image generated by a single camera. In this case, the uploader 10 may perform first processing of reducing the bit depth and/or the number of channels of an image (e.g., converting an 8-bit/3-channel image into an 8-bit/1-channel image). Alternatively, the uploader may perform second processing of reducing the size of the image. Alternatively, the uploader may perform third processing of converting a plurality of single images into video images (e.g., MP4 files) by applying a video compression algorithm (e.g., H.264, etc.). Alternatively, the uploader 10 may perform lightweighting processing based on various combinations of the above-described first processing to third processing. For example, the uploader 10 may convert a single image into a video image by sequentially performing the first processing, the second processing, and the third processing.

In another embodiment, as shown in FIG. 5, original data 21 may be a multi-image composed of a plurality of images. For example, the original data 21 may be multi-view images captured by a multi-camera. In this case, the uploader 10 may concatenate a plurality of images 21 and convert the concatenated image 23 into a lightweight image 25 by performing lightweighting processing. For example, the lightweighting processing may be performed according to the lightweighting processing method of a single image.

In another embodiment, as shown in FIG. 6, original data 31 may be a message (i.e., message object; msg) in a predefined format (see FIG. 6). In this case, the uploader 10 may store one or more messages 31 in a message Q 33 (msgQ), and may serialize the message Q 33 to convert the message Q 33 into binary data 35. In addition, the uploader 10 may compress the binary data 33 and convert the binary data 33 into lightweight data 37. In this case, the compression may be performed based on a lossless compression algorithm (e.g., zip), but the present invention is not limited thereto. The uploader 10 may perform the above-described lightweighting processing whenever the message Q 33 is in a full state, and may also perform the lightweighting processing according to a preset cycle. In addition, the uploader 10 may directly perform serialization on the messages 31 without using the message Q 33.

In another embodiment, original data may be data generated by a LIDAR (Light Imaging Detection and Ranging) sensor or a RADAR (RAdio Detection And Ranging) sensor. In this case, the uploader 10 may convert original data into a point cloud image, and may perform lightweighting processing on the converted image to generate a video image as first lightweight data. For example, the lightweighting processing may be performed according to the lightweighting processing method of a single image. Alternatively, the uploader 10 may generate second lightweight data by compressing the original data. Alternatively, the uploader 10 may generate both the first lightweight data and the second lightweight data from original data.

In another embodiment, original data may be a video image composed of a plurality of frames. In this case, the uploader 10 may perform lightweighting processing of deleting several frames with low importance among a plurality of frames. For example, the frame with low importance may be a frame with a small number of object movements, a frame with a small number of objects, a frame with a very high overlap rate with the previous frame, a frame that does not contain the object of interest, and the like, but the present invention is not limited thereto. In some cases, the uploader 10 may randomly delete a predetermined number of frames from among a plurality of frames.

In another embodiment, as shown in FIG. 7, original data 41 may be an image, and the uploader 10 may apply differentiated compression quality (or degree of lightweighting) for each area (e.g., 411, 413) of an original image 41. For example, the uploader 10 may detect an object area 411 in the original image 41, compress the object area 411 in high quality, and compress a background area 413 in low quality (see image 43). For example, detection of the object area 411 may be performed based on a computer vision algorithm or artificial intelligence-based object detection model (e.g., CNN model), but the present invention is not limited thereto. As another example, the uploader 10 may detect a plurality of object areas in the original image 41 and apply differentiated compression quality according to the importance of the object areas. That is, a relatively high compression quality may be applied to a first object area having a high importance, and a relatively low compression quality may be applied to a second object area having a low importance. For example, the importance of the object area may be determined based on the size of the area (object), whether the object is an object of interest, etc., but the present invention is not limited thereto.

In another embodiment, the original data may be an image, and the uploader 10 may perform lightweighting processing based on a deep-learning model. At this time, the deep-learning model may have a structure consisting of an encoder and a decoder. The encoder may be a neural network trained to extract feature data from an input image, and the decoder may be a neural network trained to output an image identical to the input image by decoding the feature data. In this case, the uploader 10 may extract feature data from the original image using the encoder, and convert the feature data into lightweight data by compressing the extracted feature data. In addition, the lightweight data may be converted into the original image by being decoded through the decoder after decompression.

In another embodiment, the uploader 10 may perform lightweighting processing based on a combination of various embodiments described above.

Referring again to FIG. 4, the present invention will be described.

In step S140, metadata may be tagged to lightweight data. For example, the metadata may include the identifier, size, and environment data of original data, but the present invention is not limited thereto. For example, the environment data is data about a sensing environment, and may include information about time, location (place), weather, climate, topography, road conditions, and the like, but the present invention is not limited thereto. For reference, the uploader 10 may generate environment data by collecting information provided from the Internet based on time and location information at the time of obtaining original data, but the present invention is not limited thereto.

In one embodiment, step S140 may be omitted.

In step S160, lightweight data may be uploaded. Specifically, the uploader 10 may upload lightweight data to the lightweight data store 31. In addition, the uploader 10 may register upload information such as the identifier of lightweight data and a storage location of the lightweight data store 31 in the mapping table 33. For example, the uploader 10 may register the upload information in a new entry of the mapping table 33.

In addition, according to one embodiment of the present invention, steps (operations) S100 to S160 may be performed by the uploader 10 in a pipelining manner. In this case, real-time data upload may be more reliably guaranteed. Hereinafter, for better understanding, the present embodiment will be further described with reference to FIGS. 8 and 9.

FIG. 8 conceptually illustrates an exemplary pipelining manner that may be applied to the uploader 10 according to one embodiment of the present invention.

As shown in FIG. 8, the uploader 10 may perform data acquisition operations 51-1 to 51-3, lightweighting processing operations 53-1 to 53-3, metadata tagging operations 55-1 to 55-3, and data upload operations 57-1 to 57-3 in a pipelining manner for each original data chunk (ODC1, ODC2, ODC3). However, a basic unit constituting the pipeline may be designed in a unit larger or smaller than that illustrated in FIG. 8.

In the above case, data upload may be performed more efficiently by parallelizing processing operations for a plurality of original data chunks. For example, in step 3, the metadata tagging operation 55-1 for the first original data chunk (ODC1), the lightweighting processing operation 53-3 for the second original data chunk (ODC2), and the data acquisition operation 51-3 for the third original data chunk (ODC3) may be performed in parallel.

FIG. 9 shows an implementation of the pipelining manner illustrated in FIG. 8. Specifically, FIG. 9 illustrates a process in which pipelining is performed when the uploader 10 is implemented with the configuration illustrated in FIG. 2. In addition, FIG. 9 assumes that the first computing device 11 and the second computing device 13 constituting the uploader 10 communicate through a shared directory. Hereinafter, the present invention will be described with reference to FIG. 9.

In steps 1 and 2, the first computing device 11 may obtain a first original data chunk (ODC1) and store the first original data chunk in a shared directory. In addition, the second computing device 13 may obtain the first original data chunk (ODC1) through a shared directory and convert the first original data chunk (ODC1) into a first lightweight data chunk (LDC1) through lightweighting processing. The second computing device 13 may monitor the shared directory and may obtain the original data chunk whenever the original data chunk is stored in the shared directory.

In step 3, the first computing device 11 may obtain the second original data chunk (ODC2) and store the second original data chunk in a shared directory. In addition, the second computing device 13 may tag metadata (M) to the first lightweight data chunk (LDC1). These two operations may be performed in parallel.

In step 4, the second computing device 13 may convert the second original data chunk (ODC2) into the second lightweight data chunk (LDC2) and upload a first lightweight data chunk (LDC1+M). These two operations may be performed in parallel.

In step 5, the first computing device 11 may obtain the third original data chunk (ODC3) and store the third original data chunk in a shared directory. In addition, the second computing device 13 may tag metadata (M) to the second lightweight data chunk (LDC2). These two operations may be performed in parallel.

So far, the data upload method according to one embodiment of the present invention has been described with reference to FIGS. 4 to 9. According to the above-described method, original data may be converted into lightweight data through lightweighting processing, and the converted lightweight data may be uploaded. Accordingly, real-time data upload may be guaranteed, and network costs required for data upload may be significantly reduced. In addition, by performing lightweighting processing, data upload operation, and the like in a pipelining manner, real-time data upload may be more reliably guaranteed. In addition, by applying different types of lightweighting algorithms according to the type and characteristics of original data rather than a simple compression method, the efficiency of lightweighting processing may be improved.

Hereinafter, an operation method of the tracer 50 according to one embodiment of the present invention will be described with reference to FIG. 10.

FIG. 10 is an exemplary flowchart for explaining the operation method of the tracer 50 according to one embodiment of the present invention. However, the flowchart is only a preferred embodiment for achieving the purpose of the present invention, and some steps may be added or deleted as needed.

As shown in FIG. 10, the operation method may start at step S200 of monitoring the original data store 35. For example, the tracer 50 may perform continuous monitoring to detect uploading of original data to the original data store 35.

In step S210, it may be determined whether uploading of specific original data is detected.

In steps S220 and S230, in response to determining that upload has been detected, the mapping table 33 may be inquired using the identifier of specific original data, and as a result of the inquiry, existence of a related entry may be determined.

In step S240, in response to determining that the searched entry does not exist, specific original data may be converted into lightweight data, and the converted lightweight data may be uploaded to the lightweight data store 31. Similar to the foregoing, the tracer 50 may convert specific original data into corresponding lightweight data by performing appropriate lightweighting processing according to the type of original data.

In step S250, in response to determining that the searched entry exists, the mapping table 33 may be updated by recording upload information (e.g., upload location) of original data in a searched entry. In addition, the tracer 50 may update the searched entry whenever an upload location of specific original data is changed.

In addition, when step S250 is performed after step S240, upload information such as an identifier of specific original data and an upload location may be registered in a new entry of the mapping table 33.

So far, with reference to FIG. 10, the operation method of the tracer 50 has been described in one embodiment of the present invention. According to the foregoing, the correspondence between original data and lightweight data may be effectively managed by detecting upload of original data and tracing an upload location by the tracer 50.

Hereinafter, an operation method of the coordinator 70 according to one embodiment of the present invention will be described with reference to FIGS. 11 to 13.

FIG. 11 is an exemplary flowchart for explaining the operation method of the coordinator according to one embodiment of the present invention. However, the above flowchart is only a preferred embodiment for achieving the purpose of the present invention, and some steps may be added or deleted as needed.

As shown in FIG. 11, the operation method may start at step S300 of receiving a data identifier (e.g., original data identifier or lightweight data identifier). For example, the coordinator 70 may receive a shared identifier between original data and lightweight data from a user.

In one embodiment, a plurality of tasks may be predefined, and a task identifier may be assigned to each task. In this case, the coordinator 70 may further receive a task identifier in addition to the data identifier.

In step S320, specific original data corresponding to the received data identifier may be downloaded. For example, the coordinator 70 may search the mapping table 33 with the received identifier to check upload location information of specific original data, and may download specific original data from the original data store 35 using the checked upload location information.

In step S340, a predefined task may be performed using specific original data. For example, when the predefined task is learning of the target system 3, the coordinator 70 may perform a learning task by transmitting (injecting) the specific original data to the target system 3.

In one embodiment, the coordinator 70 may further receive a task identifier. In this case, the coordinator 70 may perform (execute) a task corresponding to the task identifier using specific original data.

In step S360, a task performance result may be provided. For example, the coordinator 70 may provide the task performance result to a user.

In addition, according to one embodiment of the present invention, the download operation and data transmission operation (or task execution operation) of the coordinator 70 may be performed in a pipelining manner. In this case, download of original data and task execution may be performed more efficiently. Hereinafter, for better understanding, the present embodiment will be further described with reference to FIGS. 12 and 13.

FIG. 12 conceptually illustrates an exemplary pipelining manner that may be applied to the coordinator 70 according to one embodiment of the present invention. In particular, FIG. 12 assumes that the coordinator 70 is implemented as shown in FIG. 3.

As shown in FIG. 12, operations of the downloaders 73 to 75 and the task worker 71 may be performed in a pipelining manner. Specifically, an operation of providing a plurality of first original data chunks (ODC1 to ODC3) to the task worker 71 by the downloaders 73 to 75 and an operation of downloading a plurality of second original data chunks (ODC4 to ODC6) may be performed in parallel by pipelining (see step 2). In addition, an operation of providing the second original data chunks (ODC4 to ODC6) to the task worker 71 by the downloaders 73 to 75, an operation of downloading a plurality of third original data chunks (ODC7 to ODC9), and an operation of transmitting the first original data chunks (ODC1 to ODC3) to the target system 3 by the task worker 71 may be performed in parallel by pipelining (see step 3).

FIG. 13 shows an embodiment of the pipelining manner illustrated in FIG. 12. Specifically, FIG. 13 shows a process in which pipelining is performed when the coordinator 70 is implemented as n downloaders (e.g., 72, 76) and one task worker 71. In addition, FIG. 13 assumes that the task worker 71 and the downloaders (e.g., 72, 76) communicate through a shared directory. Hereinafter, the present invention will be described with reference to FIG. 13.

In step 0, initial settings for download of original data may be made. Specifically, an identifier may be assigned to each downloader (e.g., 72, 76), and a list of original data chunks may be shared between the downloaders (e.g., 72, 76) and the task worker 71. This initial setting may be performed by a user, but the scope of the present invention is not limited thereto. For example, the identifiers of the downloaders (e.g., 72, 76) may be assigned as sequential values (e.g., assigned as sequential values from 1 to n), but the present invention is not limited thereto. However, in the following description, for better understanding, it is assumed that the identifiers of the downloaders (e.g., 72, 76) are assigned sequentially.

In step 1, the downloaders (e.g., 72, 76) may download original data chunks (e.g., ODC1, ODCn) from the original data store 35. At this time, each downloader (e.g., 72, 76) may download the original data chunk (e.g., ODC1, ODCn) corresponding to the identifier thereof. For example, when the total number of target original data chunks is 2n, the first downloader 72 may download the 1st data chunk (e.g., ODC1) and the (n+1)th data chunk (e.g., ODCn+1), and the nth downloader 76 may download the nth data chunk (e.g., ODCn) and the 2nth data chunk (e.g., ODC2n). That is, each downloader (e.g., 72, 76) may download the original data chunk (e.g., ODC1, ODCn) whose identifier and modular operation value match. In this case, duplicate download of the original data chunk may be prevented.

In addition, the downloaders (e.g., 72, 76) may store downloaded original data chunks (e.g., ODC1, ODCn) in a shared directory. In addition, the task worker 71 may monitor storage of original data chunks (e.g., ODC1, ODCn) in the shared directory.

In step 2, the downloaders (e.g., 72, 76) may download the next original data chunk (e.g., ODCn+1, ODC2n) from the original data store 35. In addition, the task worker 71 may obtain the original data chunks (e.g., ODC1, ODC2) stored in the shared directory and transmit the original data chunks to the target system 3. These two operations may be performed in parallel.

For reference, the task worker 71 may load the second original data chunk (e.g., ODC2) on memory while transmitting the first original data chunk (e.g., ODC1) to perform the data transmission operation and the memory loading operation in parallel.

So far, the operation method of the coordinator 70 according to one embodiment of the present invention has been described with reference to FIGS. 11 to 13. As described above, since the coordinator 70 downloads original data and performs a predefined task, direct download of original data by a user may be minimized. Thus, network costs required for original data download and infrastructure construction costs for an original data store may be significantly reduced. In addition, as the operations of the coordinator 70 are performed in a pipelining manner, task execution time may be greatly reduced.

Hereinafter, an exemplary computing device 200 capable of implementing devices (e.g., uploader 10, etc.) and/or systems according to various embodiments of the present invention will be described with reference to FIG. 14.

FIG. 14 is an exemplary hardware configuration diagram showing the computing device 200.

As shown in FIG. 14, the computing device 200 may include one or more processors 210, a bus 250, a communication interface 270, a memory 230 for loading a computer program 291 executed by the processors 210, and a storage 290 for storing the computer program 291. However, FIG. 14 shows only components related to the embodiment of the present invention. Accordingly, a person skilled in the art to which the present invention pertains may know that other general-purpose components may be further included in addition to the components shown in FIG. 14.

The processors 210 may control overall operations of each component of the computing device 200. The processors 210 may include a central processing unit (CPU), a microprocessor unit (MPU), a micro controller unit (MCU), a graphic processing unit (GPU), or any form of processor well known in the art of the present invention. In addition, the processors 210 may perform operations on at least one application or program for executing operations/methods according to embodiments of the present invention. The computing device 200 may include one or more processors.

Next, the memory 230 may store various data, commands, and/or information. The memory 230 may load one or more programs 291 from the storage 290 to execute operations/methods according to embodiments of the present invention. The memory 230 may be implemented as a volatile memory such as RAM, but the scope of the present invention is not limited thereto.

Next, the bus 250 may provide a communication function between components of the computing device 200. The bus 250 may be implemented as various types of buses, such as an address bus, a data bus, and a control bus.

Next, the communication interface 270 may support wired/wireless Internet communication of the computing device 200. In addition, the communication interface 270 may support various communication methods other than internet communication. Accordingly, the communication interface 270 may include a communication module well known in the art of the present invention.

Next, the storage 290 may non-temporarily store the programs 291. The storage 290 may include a non-volatile memory such as read only memory (ROM), erasable programmable ROM (EPROM), electrically erasable programmable ROM (EEPROM), and flash memory, a hard disk, a removable disk, or a computer-readable recording medium well known in the art to which the present invention belongs.

Next, the computer program 291 may include one or more instructions that, when loaded into the memory 230, cause the processors 210 to perform operations/methods according to embodiments of the present invention. That is, the processors 210 may perform operations/methods according to embodiments of the present invention by executing the instructions.

For example, the computer program 291 may include instructions that instruct execution of an operation of obtaining original data, an operation of performing first lightweighting processing in response to determining that the obtained original data is of the first type, an operation of performing second lightweighting processing different from the first lightweighting processing in response to determining that the obtained original data is of the second type different from the first type, and an operation of uploading converted lightweight data through the first lightweighting processing or the second lightweighting processing. In this case, the uploader 10 according to one embodiment of the present invention may be implemented through the computing device 200.

As another example, the computer program 291 may include instructions that instruct execution of an operation of searching for entry of lightweight data corresponding to specific original data in the mapping table 33 in response to detecting that the specific original data is uploaded to the original data store 35 and an operation of updating the upload location of the specific original data to the searched entry. In this case, the tracer 50 according to one embodiment of the present invention may be implemented through the computing device 200.

As another example, the computer program 291 may include instructions that instruct execution of an operation of receiving the identifier of specific lightweight data stored in the lightweight data store 31, an operation of downloading original data corresponding to the specific lightweight data from the original data store 35 using the received identifier, and an operation of performing a predefined task using the downloaded original data. In this case, the coordinator 70 according to one embodiment of the present invention may be implemented through the computing device 200.

So far, the computing device 200 capable of implementing a device and/or system according to various embodiments of the present invention has been described with reference to FIG. 14.

The technical idea of the present invention described with reference to FIGS. 1 to 14 so far may be implemented as computer-readable code on a computer-readable medium. For example, the computer-readable recording medium may be a removable recording medium (CD, DVD, Blu-ray disc, USB storage device, removable hard disk) or a fixed recording medium (ROM, RAM, computer-equipped hard disk). The computer program recorded on the computer-readable recording medium may be transmitted to another computing device through a network such as the Internet and installed in the other computing device, so the computer program may be used in the other computing device.

Even when all components constituting the embodiments of the present invention are described as being combined into one, the technical idea of the present invention is not necessarily limited to these embodiments. That is, within the scope of the purpose of the present invention, one or more components may be selectively combined and operated.

Although operations are shown in a particular order in the drawings, it should not be understood that the operations must be performed in the particular order or performed in a sequential order to obtain a desired result. In certain circumstances, multitasking and parallel processing may be advantageous. Moreover, it should not be understood that separation of the various components in the above-described embodiments is absolutely necessary. It should also be understood that the described program components and systems may generally be integrated into a single software product or packaged into multiple software products.

Embodiments of the present invention have been described with reference to the accompanying drawings. A person skilled in the art to which the present invention pertains may understand that the present invention may be implemented in other specific forms without changing the technical spirit or essential features of the present invention. Therefore, it should be understood that the aforementioned examples are only provided by way of example and not provided to limit the present invention. The scope of protection of the present invention should be defined by the following claims, and all technical ideas within the scope of protection should be construed as being included in the scope of the present invention.

The invention claimed is:

1. A data management system comprising:
  a memory configured to store computer-readable instructions;
  a hierarchical data repository configured to include: a lightweight data repository configured to upload lightweight data and implemented as a cloud storage, an original data repository configured to upload original data and implemented as a local storage, and a table mapping table configured to store correspondence between the lightweight data and the original data;
  and one or more processors configured to execute the computer-readable instructions such that the one or more processors are configured to:
  obtain original data from one or more sensors, convert the obtained original data into corresponding lightweight data through lightweighting processing, upload the converted lightweight data to a lightweight data store, register upload information about the converted lightweight data in a mapping table, in response to detecting upload of specific original data to an original data store, search entry of lightweight data corresponding to the specific original data in the mapping table, and update an upload location of the specific original data to the searched entry,
  wherein, in response to determining that the searched entry does not exist, the one or more processors are configured to generate lightweight data corresponding to the specific original data through lightweighting processing, upload the generated lightweight data to the lightweight data store, and register upload information about the generated lightweight data in the mapping table;
wherein the original data includes a single image or a multi-image, and wherein the lightweighting processing is configured to: i) reduce the bit depth or the number of channels of the original data, and ii) reduce the size of the original data, or concatenate the original data and then reduce the size of the concatenated original data.

2. The data management system according to claim 1, wherein the upload information comprises a shared identifier between the original data and the corresponding lightweight data, and
the one or more processors are configured to search the mapping table using the shared identifier of the specific original data.

3. The data management system according to claim 1, wherein the lightweight data store is implemented as a store with higher user accessibility than the original data store.

4. The data management system according to claim 1, wherein the one or more processors are configured to comprise a first computing device for obtaining the original data and a second computing device for performing the lightweighting processing.

5. The data management system according to claim 1, wherein the one or more processors are configured to perform operation of obtaining the original data, operation of converting the original data into the lightweight data, and operation of uploading the lightweight data to the lightweight data store in a pipelining manner.

6. The data management system according to claim 1, wherein the one or more processors are configured to download the specific original data from the original data store and perform a predefined task using the specific original data.

7. The data management system according to claim 6, wherein the one or more processors are configured to perform the download and the task in response to a user's request and provide a result of performing the task to the user.

8. The data management system according to claim 6, wherein the one or more processors are configured to comprise a downloader for downloading the specific original data and a task worker for performing the task,
wherein operation of the downloader and operation of the task worker are performed in a pipelining manner.

* * * * *